(12) United States Patent
Mariott et al.

(10) Patent No.: US 9,637,567 B2
(45) Date of Patent: May 2, 2017

(54) SPRAY-DRIED CATALYST COMPOSITIONS AND POLYMERIZATION PROCESSES EMPLOYING THE SAME

(75) Inventors: Wesley R. Mariott, Pearland, TX (US); Phuong A. Cao, Old Bridge, NJ (US); Daniel P. Zilker, Jr., Charleston, WV (US); John H. Oskam, Flemington, NJ (US); Cliff R. Mure, Hillsborough, NJ (US)

(73) Assignee: Univation Technologies, LLC, Houston, TX (US)

( * ) Notice: Subject to any disclaimer, the term of this patent is extended or adjusted under 35 U.S.C. 154(b) by 139 days.

(21) Appl. No.: 14/117,272

(22) PCT Filed: Mar. 28, 2012

(86) PCT No.: PCT/US2012/030805
§ 371 (c)(1),
(2), (4) Date: Jan. 8, 2015

(87) PCT Pub. No.: WO2012/158260
PCT Pub. Date: Nov. 22, 2012

(65) Prior Publication Data
US 2015/0133615 A1 May 14, 2015

Related U.S. Application Data

(60) Provisional application No. 61/485,724, filed on May 13, 2011.

(51) Int. Cl.
| | | |
|---|---|---|
| *B01J 31/28* | (2006.01) | |
| *C08F 4/52* | (2006.01) | |
| *C08F 4/80* | (2006.01) | |
| *C08F 4/70* | (2006.01) | |
| *C08F 10/00* | (2006.01) | |
| *B01J 31/40* | (2006.01) | |
| *B01J 37/00* | (2006.01) | |

(52) U.S. Cl.
CPC ............ *C08F 4/7042* (2013.01); *C08F 10/00* (2013.01); *B01J 31/403* (2013.01); *B01J 37/0045* (2013.01)

(58) Field of Classification Search
CPC .. C08F 4/34; C08F 4/7042; C08F 4/76; C08F 2410/04
See application file for complete search history.

(56) References Cited

U.S. PATENT DOCUMENTS

| | | | |
|---|---|---|---|
| 5,955,555 A | 9/1999 | Bennett | |
| 6,214,761 B1 * | 4/2001 | Bennett | 502/117 |
| 6,232,259 B1 | 5/2001 | Ittel et al. | |
| 6,252,022 B1 | 6/2001 | Arthur et al. | |
| 6,271,325 B1 | 8/2001 | McConville et al. | |
| 6,281,303 B1 | 8/2001 | Lavoie et al. | |
| 6,310,153 B2 | 10/2001 | Ittel et al. | |
| 6,365,690 B1 | 4/2002 | Lenges | |
| 6,417,364 B1 | 7/2002 | Lenges | |
| 6,423,848 B2 | 7/2002 | Bennett | |
| 6,432,862 B1 | 8/2002 | Bennett | |
| 6,441,117 B1 | 8/2002 | Cameron | |
| 6,451,939 B1 | 9/2002 | Britovsek et al. | |
| 6,458,979 B1 | 10/2002 | Johnson | |
| 6,461,994 B1 | 10/2002 | Gibson et al. | |
| 6,521,724 B2 | 2/2003 | Arthur et al. | |
| 6,531,424 B2 | 3/2003 | Ittel et al. | |
| 6,534,604 B2 | 3/2003 | Loveday et al. | |
| 6,559,091 B1 | 5/2003 | Moody et al. | |
| 6,586,541 B2 | 7/2003 | Citron | |
| 6,605,675 B2 | 8/2003 | Mawson et al. | |
| 6,620,895 B1 | 9/2003 | Cotts et al. | |
| 6,677,267 B2 | 1/2004 | Berardi et al. | |
| 6,699,955 B1 | 3/2004 | Bennett et al. | |
| 6,759,501 B2 | 7/2004 | Cameron | |
| 6,803,432 B2 | 10/2004 | Bennett et al. | |
| 6,831,143 B2 * | 12/2004 | Britovsek ............ C07D 213/53 526/161 |
| 6,841,631 B2 | 1/2005 | Loveday et al. | |
| 6,846,886 B2 | 1/2005 | Mawson et al. | |

(Continued)

FOREIGN PATENT DOCUMENTS

| | | | |
|---|---|---|---|
| EP | 1131361 | 9/2001 | |
| WO | WO 99/12981 A1 * | 3/1999 | ............... C08F 4/70 |
| WO | WO 99/012981 A1 | 3/1999 | |
| WO | WO 01/23445 | 4/2001 | |
| WO | WO 01/30861 | 5/2001 | |
| WO | WO 01/44321 A1 | 6/2001 | |
| WO | WO 02/46243 | 6/2002 | |

*Primary Examiner* — Rip A Lee
(74) *Attorney, Agent, or Firm* — Brooks, Cameron & Huebsch, PLLC

(57) ABSTRACT

Spray-dried catalyst compositions comprising a transition metal complex and polymerization processes employing the same are disclosed herein. An embodiment provides a spray-dried catalyst composition comprising a transition metal catalyst component represented by the following formula: (I) and polymerization process employing the same.

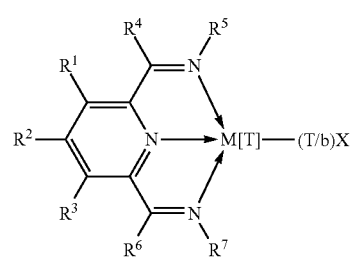

(I)

18 Claims, 3 Drawing Sheets

(56) References Cited

U.S. PATENT DOCUMENTS

| | | |
|---|---|---|
| 6,894,128 B2 | 5/2005 | Loveday et al. |
| 6,900,153 B2 | 5/2005 | Preishuber-Pfluegl |
| 6,903,176 B2 | 6/2005 | Cameron |
| 6,933,359 B2 | 8/2005 | Bennett et al. |
| 6,956,089 B2 | 10/2005 | Mawson et al. |
| 6,982,237 B2 | 1/2006 | Wagner et al. |
| 7,022,787 B2 | 4/2006 | Spence et al. |
| 7,041,764 B2 | 5/2006 | Bennett et al. |
| 7,056,996 B2 | 6/2006 | Mackenzie et al. |
| 7,148,175 B2 | 12/2006 | Citron |
| 7,276,566 B2 * | 10/2007 | Muruganandam ... B01J 37/0045 502/103 |
| 7,319,084 B2 | 1/2008 | Moody et al. |
| 7,566,677 B2 | 7/2009 | Muruganandam et al. |
| 7,718,566 B2 | 5/2010 | Wenzel et al. |
| 8,618,228 B2 * | 12/2013 | Schuhen et al. ............... 526/75 |

\* cited by examiner

SPRAY-DRIED CATALYST COMPOSITIONS AND POLYMERIZATION PROCESSES EMPLOYING THE SAME

CROSS-REFERENCE TO RELATED APPLICATIONS

This application is a National Stage application under 35 U.S.C. §371 of International Application No. PCT/US2012/030805, filed Mar. 28, 2012, that claims the benefit of Ser. No. 61/485,724, filed May 13, 2011, the disclosures of which are incorporated by reference in their entireties.

FIELD OF THE INVENTION

Disclosed herein are spray-dried catalyst compositions comprising a transition metal complex and polymerization processes employing the same.

BACKGROUND

Advances in polymerization and catalysts have produced new polymers having improved physical and mechanical properties useful in a wide variety of products and applications. With the development of new catalysts, the choice of polymerization, such as solution, slurry, high pressure, or gas phase, for producing a particular polymer has been greatly expanded. Advances in polymerization technology have also provided more efficient, highly productive and economically enhanced processes.

Metallocene catalysts have been widely used to produce polyolefins such as polyethylene polymers. They have provided efficient processes and a variety of new and improved polymers. In addition, catalyst compositions have also been used that comprise more than one catalyst or catalyst component, in effect, providing more than one active site to polymerize monomers during the polymerization process. Two or more different catalyst components have been used, for example, to produce multimodal polymers. However, there is continued focus in the industry on developing new and improved catalyst compositions. Some have focused on designing the catalyst compositions to produce new polymers, others on improved operability, and yet others on improving catalyst productivity.

Polymers produced with a multimodal molecular weight distribution offer unique product properties. Multimodal products can be produced by various methods, such as mixing different polymers, producing multimodal polymers under a series of reaction conditions, and reacting different catalysts under a single reactor condition. One method that has proven to be commercially viable is the production of multimodal catalyst systems wherein a catalyst system comprises more than one catalyst or catalyst component, thus, in effect, providing more than one active site to polymerize monomers during the polymerization process. When fed to a reaction system, each catalyst component concurrently produces a polymer component with distinct product properties. The net result is a polymer composition with distinct product advantages.

A number of different processes and techniques have been developed for making multimodal catalyst systems, and polymers with these multimodal catalyst systems. For example, bimodal catalyst compositions have been used that comprise a combination of a Group 15 containing metal compound (a bisamide compound) and a metallocene compound. One of the advantages of these multimodal catalyst systems lies in the molecular weight split (ratio of high to low molecular weight polymer produced). The productivity of a catalyst, that is, the amount of polymer produced per gram of the catalyst, as well as tailoring of the molecular weight split of polymer produced with these multimodal catalysts can be an important concern for polyolefin producers. Thus, there is a continued need for new and improved catalysts and catalyst compositions.

SUMMARY

Disclosed herein are spray-dried catalyst compositions comprising a transition metal catalyst component represented by the following formula:

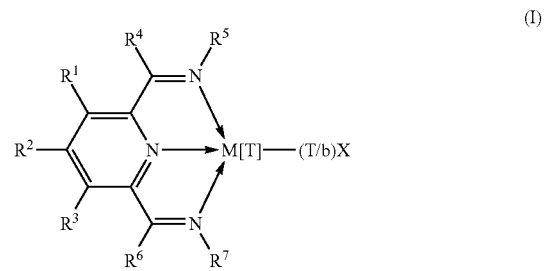

(I)

wherein:
M is Fe[II], Fe[III], Co[I], Co[II], Co[III], Mn[I], Mn[II], Mn[III], Mn[IV], Ru[II], Ru[III] or Ru[IV];
X represents an atom or group covalently or ionically bonded to the metal M;
T is the oxidation state of the metal;
b is the valency of the atom or group X; and
$R_1$ to $R_7$ are each independently selected from the group consisting of hydrogen, halogen, hydrocarbyl, substituted hydrocarbyl, heterohydrocarbyl, substituted heterohydrocarbyl, aryl, hydrocarbyl substituted aryl, heterohydrocarbyl substituted aryl, benzyl, hydrocarbyl substituted benzyl, heterohydrocarbyl substituted benzyland SiR'$_3$ where each R' is independently selected from hydrogen, halogen, hydrocarbyl, substituted hydrocarbyl, heterohydrocarbyl, substituted heterohydrocarbyl; and when any two or more of $R_1$ to $R_7$ are hydrocarbyl, substituted hydrocarbyl, heterohydrocarbyl, substituted heterohydrocarbyl, aryl, hydrocarbyl substituted aryl, heterohydrocarbyl substituted aryl, benzyl, hydrocarbyl substituted benzyl or heterohydrocarbyl substituted benzyl the two or more can be linked to form one or more cyclic substituents.

BRIEF DESCRIPTION OF THE DRAWINGS

These drawings illustrate certain aspects of the present invention and should not be used to limit or define the invention.

DETAILED DESCRIPTION

Figure 1:
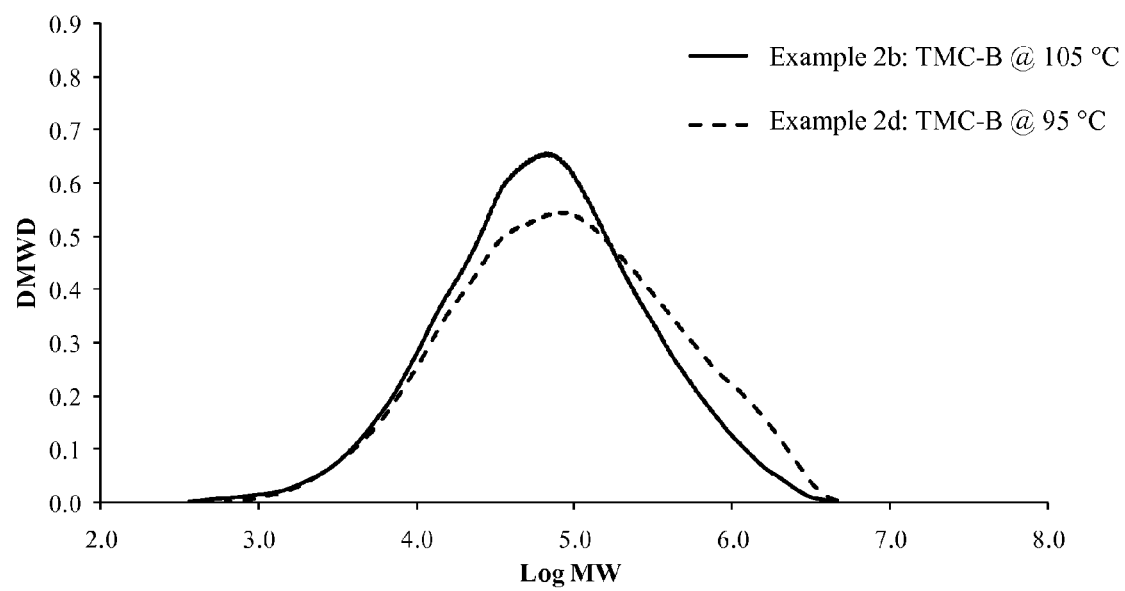
FIGS. 1-5 are graphical representations showing gel permeation chromatography overlays for various polyethylene resins produced by spray-dried catalyst compositions.

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

Disclosed herein are spray-dried catalyst compositions comprising a transition metal complex catalyst component. Also provided are spray-dried mixed catalyst compositions that comprise a transition metal complex catalyst component and a non-metallocene catalyst component, such as a Group 15-containing catalyst component. Also provided are spray-dried mixed catalyst compositions comprising a transition metal complex catalyst component, a non-metallocene catalyst component, and a metallocene catalyst component. Polymerization processes employing the spray-dried catalyst compositions, methods of making the spray-dried catalyst compositions, and polymer products produced by the polymerization processes are also described herein.

It has been discovered that the productivity of a transition metal complex catalyst may be improved by spray-drying. In addition, it has been further discovered that the productivity of a spray-dried mixed catalyst composition comprising a non-metallocene catalyst component and/or a metallocene catalyst component may also be improved by combination with a transition metal complex catalyst. This is significant in that can provide for a more economic catalyst system as it allows for preparation of a polymer at lower reactor temperatures and with increased catalyst productivity using embodiments of the catalyst compositions described herein. Even further, it has been discovered that the molecular weight distribution of a multimodal polymer product produced using spray-dried mixed catalyst compositions described herein may be narrowed, and the melt flow ratio decreased, by incorporation of a transition metal complex catalysts into the spray-dried mixed catalyst composition. Additionally, it has further been discovered that multimodal polymer products with decreased overall molecular weight and, hence, higher melt indices may be produced by incorporation of a transition metal complex catalysts in the spray-dried mixed catalyst composition. Further, incorporation of a transition metal complex catalyst into the spray-dried mixed catalyst composition comprising a non-metallocene catalyst component and/or a metallocene catalyst component can provide the ability to manipulate the resultant polymer molecular weight and melt index as well as the molecular weight distribution and melt-flow ratio while preserving the overall polymer product properties.

In the following description and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all references to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The term "catalyst," as used herein, is used interchangeably with the term "catalyst component," and includes any compound or component, or combination of compounds and components, that is capable of increasing the rate of a chemical reaction, such as the polymerization or oligomerization of one or more olefins.

The term "catalyst composition," as used herein, may include any number of catalysts in any combination as described herein, as well as any activator and support in any combination described herein.

The term "multimodal polymer," as used herein, means a polymer comprising at least a "bimodal molecular weight distribution," which term is understood as having the broadest definition persons in the pertinent art have given that term as reflected in printed publications and issued patents. Thus, a multimodal polymer may have at least two molecular weight peaks. For example, a single composition that includes polyolefins with at least two identifiable molecular weight distributions is considered to be a "multimodal" polymer, as that term is used herein. In some embodiments, other than having different molecular weights, the polymer components may have different levels of comonomer distributions.

Transition Metal Complex Catalyst Components

The catalyst compositions described herein may comprise a transition metal complex catalyst component. For example, spray-dried catalyst compositions may be used that comprises a transition metal complex catalyst component. Embodiments of the transition metal complex catalyst components that may be used include a transition metal complex having a bis(imino)pyridyl supporting ligand structure. An example of a suitable transition metal complex may be represented by the following formula (I):

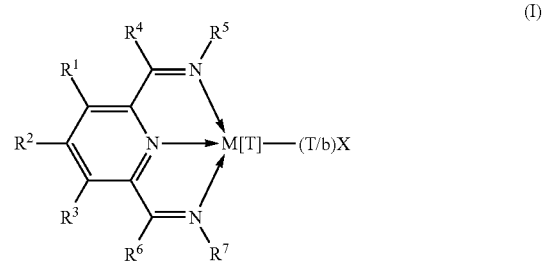

wherein:
M is Fe[II], Fe[III], Co[I], Co[II], Co[III], Mn[I], Mn[II], Mn[III], Mn[IV], Ru[II], Ru[III] or Ru[IV];
X represents an atom or group covalently or ionically bonded to the metal M;
T is the oxidation state of the metal;
b is the valency of the atom or group X; and
$R_1$ to $R_7$ are each independently selected from the group consisting of hydrogen, halogen, hydrocarbyl, substituted hydrocarbyl, heterohydrocarbyl, substituted heterohydrocarbyl, aryl, hydrocarbyl substituted aryl, heterohydrocarbyl substituted aryl, benzyl, hydrocarbyl substituted benzyl, heterohydrocarbyl substituted benzyland $SiR'_3$ where each R' is independently selected from hydrogen, halogen, hydrocarbyl, substituted hydrocarbyl, heterohydrocarbyl, substituted heterohydrocarbyl; and when any two or more of $R_1$ to $R_7$ are hydrocarbyl, substituted hydrocarbyl, heterohydrocarbyl, substituted heterohydrocarbyl, aryl, hydrocarbyl substituted aryl, heterohydrocarbyl substituted aryl, benzyl, hydrocarbyl substituted benzyl or heterohydrocarbyl substituted benzyl the two or more can be linked to form one or more cyclic substituents.

In some embodiments, M in formula (I) above is Fe[II], Fe[III], Ru[II], Mn[II], Co[II], Ru[III] or Ru [IV].

In some embodiments of the transition metal complex of Formula (I), $R^5$ may be represented by the represented by formula (II) and $R^7$ may be represented by formula (III):

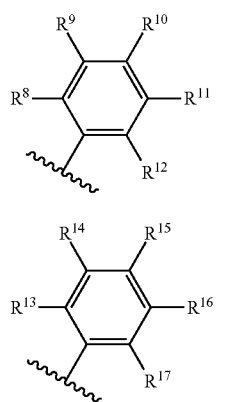

wherein:
$R^8$ to $R^{17}$ are independently selected from the group consisting of hydrogen, halogen, hydrocarbyl, substituted hydrocarbyl, heterohydrocarbyl, and substituted heterohydrocarbyl, when any two or more of $R^1$ to $R^4$, $R^6$ and $R^8$ to $R^{17}$ are hydrocarbyl, substituted hydrocarbyl, or substituted heterohydrocarbyl, the two or more can be linked to form one or more cyclic substituents.

The ring systems of formulae (II) and (III) may each be independently hydrocarbyl substituted aryl groups, for example, 2,6-hydrocarbylphenyl, 2,4,6-hydrocarbylphenyl or fused-ring polyaromatic, for example, 1-naphthyl, 2-naphthyl, 1-phenanthrenyl and 8-quinolinyl.

In some embodiments, at least one of $R^8$, $R^{10}$, $R^{12}$, $R^{13}$, $R^{15}$ or $R^{17}$ is hydrocarbyl, substituted hydrocarbyl, heterohydrocarbyl or substituted heterohydrocarbyl. For example, at least one of $R^8$, $R^{16}$ or $R^{12}$, and at least one of $R^{13}$, $R^{15}$ or $R^{17}$ is hydrocarbyl, substituted hydrocarbyl, heterohydrocarbyl, or substituted heterohydrocarbyl. In another example, $R^8$, $R^{10}$, $R^{12}$, $R^{13}$, $R^{15}$ or $R^{17}$ are all independently selected from the group consisting of hydrocarbyl, substituted hydrocarbyl, heterohydrocarbyl, or substituted heterohydrocarbyl. In yet another example, $R^8$, $R^{10}$, $R^{12}$, $R^{13}$, $R^{15}$ or $R^{17}$ are all independently selected from the group consisting of methyl, ethyl, n-propyl, iso-propyl, n-butyl, sec-butyl, tert-butyl, n-pentyl, neopentyl, n-hexyl, 4-methylpentyl, n-octyl, phenyl, and benzyl.

$R^1$ to $R^4$, $R^6$, and $R^8$ to $R^{17}$ may each be independently selected from the group consisting of hydrogen and $C_1$ to $C_8$ hydrocarbyl, for example, methyl, ethyl, n-propyl, n-butyl, t-butyl, n-hexyl, n-octyl, phenyl, and benzyl. For example, $R^{16}$ and $R^{15}$ may each be independently selected from group consisting of hydrogen, $C_1$ to $C_8$ hydrocarbyl (e.g., methyl, ethyl, n-propyl, iso-propyl, n-butyl, sec-butyl, tert.-butyl, n-pentyl, neopentyl, n-hexyl, 4-methylpentyl, n-octyl, phenyl, benzyl, fluorine, chlorine, bromine, and iodine.

In some embodiments, $R^5$ is represented by formula (II); $R^7$ is represented by Formula (III); $R^1$, $R^2$, $R^3$, $R^8$, $R^9$, $R^{11}$, $R^{14}$, $R^{16}$, and $R^{17}$ are each hydrogen; $R^4$, $R^6$, $R^{12}$, and $R^{13}$, are each represented by methyl, and $R^{10}$ and $R^{15}$ are each represented by fluorine.

In some embodiments, $R^5$ is represented by formula (II); $R^7$ is represented by Formula (III); $R^1$, $R^2$, $R^3$, $R^9$, $R^{10}$, $R^{11}$, $R^{14}$, $R^{15}$, and $R^{16}$ are each hydrogen; and $R^4$, $R^6$, $R^8$, $R^{12}$, $R^{13}$, and $R^{17}$ are each represented by methyl.

In some embodiments, $R^5$ is represented by formula (II); $R^7$ is represented by Formula (III); $R^1$, $R^2$, $R^3$, $R^9$, $R^{11}$, $R^{14}$ and $R^{16}$ are each hydrogen; and $R^4$, $R^6$, $R^8$, $R^{10}$, $R^{12}$, $R^{13}$, $R^{15}$ and $R^{17}$ are each represented by methyl.

In some embodiments, $R^5$ is a group having the formula —$NR^{18}R^{19}$, $R^7$ is a group having the formula —$NR^{20}R^{21}$, wherein $R^{18}$ to $R^{21}$ are independently selected from the group consisting of hydrogen, halogen, hydrocarbyl, substituted hydrocarbyl, heterohydrocarbyl, and substituted heterohydrocarbyl; when any two or more of $R^1$ to $R^4$, $R^6$ and $R^{18}$ to $R^{21}$ are hydrocarbyl, substituted hydrocarbyl, heterohydrocarbyl or substituted heterohydrocarbyl, the two or more can be linked to form one or more cyclic substituents.

Each of the nitrogen atoms is coordinated to the metal by a "dative" bond, i.e., a bond formed by donation of a lone pair of electrons from the nitrogen atom. The remaining bonds on each of these atoms are covalent bonds formed by electron sharing between the atoms and the organic ligand as shown in the defined formula for the metal complex illustrated above.

Non-Metallocene Catalyst Components

Non-metallocene catalyst components may be used in the catalyst compositions described herein. For example, spray-dried mixed catalyst compositions may be used that comprise a transition metal complex catalyst component and a non-metallocene catalyst component.

The non-metallocene catalyst component may be a Group 15-containing catalyst. As used herein, the term "Group 15-containing catalyst" includes Group 3 to Group 12 metal complexes, wherein the metal is 2 to 4 coordinate and the coordinating moiety or moieties include at least two Group 15 atoms, and up to four Group 15 atoms. For example, the Group 15-containing catalyst may be a complex of a Group 4 metal and from one to four ligands, such that the Group 4 metal is at least 2 coordinate and the coordinating moiety or moieties include at least two nitrogens. Examples of suitable Group 15-containing catalyst are described in WO99/01460; EP0893454A1; and U.S. Pat. Nos. 5,318,935; 5,889,128; 6,333,389B2; 6,271,325B1; and 7,718,566.

In some embodiments, the Group 15-containing catalyst may include Group 4 imino-phenol complexes, Group 4 bis(amide) complexes, and Group 4 pyridyl-amide complexes that are active towards olefin polymerization to any extent.

The Group 15-containing catalyst may be described by the following formula (IV):

$$\alpha_a \beta_b \gamma_g M X_n \qquad (IV)$$

Each X of formula (IV) may be independently selected from the group consisting of halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, halogenated $C_1$ to $C_{12}$ alkyls, halogenated $C_2$ to $C_{12}$ alkenyls, halogenated $C_6$ to $C_{12}$ aryls, halogenated $C_7$ to $C_{20}$ alkylaryls, halogenated $C_1$ to $C_{12}$ alkoxys, halogenated $C_6$ to $C_{16}$ aryloxys, halogenated $C_7$ to $C_{18}$ alkylaryloxys, $C_1$ to $C_{12}$ heteroatom-containing hydrocarbons, and substituted derivatives thereof. Each X may also be selected from the group consisting of halogen substituted alkoxides, phenoxides, carboxylates, sulfonates, triflates, sulfides, and derivates thereof. Examples of suitable carboxylates include, but are not limited to, trifluoroacetate and pentafluorobenzoate. Examples of suitable sulfonates include, but are not limited to, trifluoromethanesulfonate ("triflate") and benzene sulfonate. In some embodiments, each X may also be selected from fluorinated alkyl amides, fluorinated alkenyl amides, fluorinated alkylaryl amides, fluorinated alkoxy amides, fluorinated aryloxy amides, fluorinated alkylaryloxys amides, fluorinated amides, and derivates thereof. In some embodiments, at least one X is a halogentated aryloxy group or a derivative thereof. For example, at least one X may be a pentafluorophenoxy group.

M of formula (IV) may be selected from Group 3 to Group 12 atoms; or may be selected from Group 3 to Group 10 atoms; or may be selected from Group 3 to Group 6 atoms; or may be selected from Ni, Cr, Ti, Zr and Hf; or may be selected from Zr and Hf.

Each β and γ of formula (IV) may be groups that each comprise at least one Group 14 to Group 16 atom; and β (when present) and γ are groups bonded to M through between 2 and 6 Group 14 to Group 16 atoms, at least two atoms being Group 15-containing atoms. More particularly, β and γ are groups that may be selected from Group 14 and Group 15-containing: alkyls, aryls, alkylaryls, and heterocyclic hydrocarbons, and chemically bonded combinations thereof; or may be selected from Group 14 and Group 15-containing: $C_1$ to $C_{10}$ alkyls, $C_6$ to $C_{12}$ aryls, $C_6$ to $C_{18}$ alkylaryls, and $C_4$ to $C_{12}$ heterocyclic hydrocarbons, and chemically bonded combinations thereof; or may be selected from $C_1$ to $C_{10}$ alkylamines, $C_1$ to $C_{10}$ alkoxys, $C_6$ to $C_{20}$ alkylarylamines, $C_6$ to $C_{18}$ alkylaryloxys, and $C_4$ to $C_{12}$ nitrogen-containing heterocyclic hydrocarbons, and $C_4$ to $C_{12}$ alkyl-substituted nitrogen-containing heterocyclic hydrocarbons and chemically bonded combinations thereof; or may be selected from anilinyls, pyridyls, quinolyls, pyrrolyls, pyrimidyls, purinyls, imidazyls, indolyls, $C_1$ to $C_6$ alkyl substituted groups selected from anilinyls, pyridyls, quinolyls, pyrrolyls, pyrimidyls, purinyls, imidazyls, indolyls; $C_1$ to $C_6$ alkylamine substituted groups selected from anilinyls, pyridyls, quinolyls, pyrrolyls, pyrimidyls, purinyls, imidazyls, indolyls, amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, and chemically bonded combinations thereof.

Each α of formula (IV) may be a linking (or "bridging") moiety that, when present, forms a chemical bond to each of β or two γ, thus forming a "γαγ"a." or "γαβ" ligand bound to M; α may also comprise a Group 14 to Group 16 atom which may be bonded to M through the Group 14 to Group 16 atom; and more particularly, α may be a divalent bridging group selected from alkylenes, arylenes, alkenylenes, heterocyclic arylenes, alkylarylenes, heteroatom containing alkylenes, heteroatom containing alkenylenes, and heterocyclic hydrocarbonylenes; or a may be selected from the group consisting of $C_1$ to $C_{10}$ alkylenes, $C_2$ to $C_{10}$ alkenylenes, $C_6$ to $C_{12}$ arylenes, $C_1$ to $C_{10}$ divalent ethers, $C_6$ to $C_{12}$ O- or N-containing arylenes, $C_2$ to $C_{10}$ alkyleneamines, $C_6$ to $C_{12}$ aryleneamines, and substituted derivatives thereof.

In formula (IV), a is an integer from 0 to 2, b is an integer from 0 to 2, and g is an integer from 1 to 2. In some embodiments, a may be either 0 or 1; or a may be 1. In some embodiments, a is 1, b is 0 and g is 2. In formula (IV), n is an integer from 0 to 4. In some embodiments, n may be an integer from 1 to 3; or n may be an integer from 2 to 3.

The spray-dried mixed catalyst composition may have a mole ratio of the non-metallocene catalyst component to the transition metal complex catalyst composition of from about 10:1 to about 1:1, or from about 5:1 to about 1:1, or from about 3:1 to about 1:1.

As used herein, the term "chemically bonded combinations thereof" means that adjacent groups, (β and γ groups) may form a chemical bond between them. For example, the β and γ groups may be chemically bonded through one or more a groups there between.

As used herein, the terms "alkyleneamines" and "aryleneamines" describe alkylamines and arylamines (respectively) that are deficient by two hydrogens, thus forming chemical bonds with two adjacent γ groups, or adjacent β and γ groups. Thus, an example of an alkyleneamine is —$CH_2CH_2N(CH_3)CH_2CH_2$—, and an example of a heterocyclic hydrocarbylene or arylene amine is —$C_5H_3N$-(divalent pyridine). An "alkylene-arylamine" is a group such as, for example, —$CH_2CH_2(C_5H_3N)CH_2CH_2$—.

Metallocene Catalyst Components

Metallocene catalyst components may be used in the catalyst compositions described herein. For example, spray-dried mixed catalyst compositions may be used that comprise a transition metal complex catalyst component and a metallocene catalyst component.

The metallocene catalyst component may include metallocene catalysts typically referred to as "half sandwich," (i.e., at least one ligand) or "full sandwich," (i.e., at least two ligands) compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocene(s)" or "metallocene catalyst component(s)."

The metallocene catalyst components may include compounds represented by the formula (V):

$$Cp^A Cp^B MX_n \qquad (V)$$

The metal atom "M" of the metallocene catalyst component, as described throughout the specification and claims, may be selected from the group consisting of Groups 3 through 12 atoms and lanthanide Group atoms; or may be selected from the group consisting of Groups 4, 5 and 6 atoms; or may be a Ti, Zr, or Hf atom; or may be a Zr atom.

The groups bound the metal atom "M" is such that the compounds described below in the formulas and structures are neutral, unless otherwise indicated. The Cp ligand(s) form at least one chemical bond with the metal atom M to form the metallocene. The Cp ligands are distinct from the leaving groups bound to the catalyst comp in that they are not highly susceptible to substitution/abstraction reactions. In some embodiments, M is as described above; each X is chemically bonded to M; each Cp group is chemically bonded to M; and n is 0 or an integer from 1 to 4, or n is either 1 or 2.

The ligands represented by $Cp^A$ and $Cp^B$ in formula (V) may be the same or different cyclopentadienyl ligands or ligands isolobal to cyclopentadienyl, either or both of which may contain heteroatoms and either or both of which may be substituted by one or more groups R. For example, $Cp^A$ and $Cp^B$ may be independently selected from the group consisting of cyclopentadienyl, indenyl, tetrahydroindenyl, fluorenyl, and substituted derivatives of each.

Independently, each $Cp^A$ and $Cp^B$ of formula (V) may be unsubstituted or substituted with any one or combination of substituent groups R. Non-limiting examples of substituent groups R as used in formula (V) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with formula (V) includes methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyl-diethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In some embodiments, at least two R groups, for example two adjacent R groups, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in formula (V) is independently selected from the group consisting of: any leaving group; for example, halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, X is a $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, or $C_1$ to $C_{12}$ heteroatom-containing hydrocarbons, and substituted derivatives thereof. In some embodiments, X may be hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, or $C_7$ to $C_{18}$ fluoroalkylaryls. In some embodiments, X may be selected from hydride, chloride, fluoride, methyl, phenyl, phenoxy, benzoxy, tosyl, fluoromethyls, and fluorophenyls; or may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls; or may be selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or may be selected from fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls). In some embodiments, at least one X is a halogentated aryloxy group or a derivative thereof. For example, at least one X may be a pentafluorophenoxy group.

The metallocene catalyst component may include those metallocenes of formula (V) where $Cp^A$ and $Cp^B$ are bridged to each other by at least one bridging group, (A), such that the structure is represented by formula (VI):

$$Cp^A(A)Cp^B MX_n \qquad (VI)$$

These bridged compounds represented by formula (VI) are known as "bridged metallocenes." $Cp^A$, $Cp^B$, M, X and n are as defined above for formula (V); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, and divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (V) including halogen radicals and iron. More particular non-limiting examples of bridging group (A) are represented by $C_1$ to $C_6$ alkylenes, substituted $C_1$ to $C_6$ alkylenes, oxygen, sulfur, R'$_2$C═, R'$_2$Si═, —Si(R')$_2$Si(R'$_2$)—, R'$_2$Ge═, R'P═(wherein "═" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In some embodiments, the bridged metallocene catalyst component of formula (VI) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents may be a hydrocarbyl (e.g., alkyl such as methyl) or halogen (e.g., F, CO. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in a particular embodiment), such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (V) and (VI) may be different from each other in some embodiments, and may be the same in other embodiments.

The metallocene catalyst components may include monoligand metallocene compounds (e.g., moNo. cyclopentadienyl catalyst components) such as described in WO 93/08221.

The metallocene catalyst component may be an unbridged "half sandwich" metallocene represented by the formula (VII):

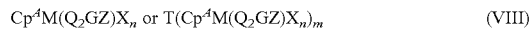

In formula VII, $Cp^A$ is defined as for the Cp groups in formula (V) and is a ligand that is bonded to M; each Q is independently bonded to M; Q is also bound to $Cp^A$ in one embodiment; X is a leaving group as described above in formula (V); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (VII), Q may be selected from the group consisting of ROO⁻, RO—, R(O)—, —NR—, —CR$_2$—, —S—, —NR$_2$, —CR$_3$, —SR, —SiR$_3$, —PR$_2$, —H, and substituted and unsubstituted aryl groups, wherein R is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, R may be selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (VIII), such as described in, for example, U.S. Pat. No. 6,069,213:

In formula (VIII), M, $Cp^A$, X and n are as defined above; and $Q_2GZ$ forms a polydentate ligand unit (e.g., pivalate), wherein at least one of the Q groups form a bond with M, and is defined such that each Q is independently selected from the group consisting of —O—, —NR—, —CR$_2$— and —S—; G is either carbon or silicon; and Z is selected from the group consisting of R, —OR, —NR$_2$, —CR$_3$, —SR, —SiR$_3$, —PR$_2$, and hydride, providing that when Q is —NR—, then Z is selected from the group consisting of —OR, —NR$_2$, —SR, —SiR$_3$, —PR$_2$; and provided that neutral valency for Q is satisfied by Z; and wherein each R is independently selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In another embodiment, R is selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys. In a particular embodiment, n is 1 or 2 in a particular embodiment.

In formula (VIII), m is an integer from 1 to 7; m is an integer from 2 to 6 in a more particular embodiment; and T is a bridging group selected from the group consisting of $C_1$ to $C_m$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^4M(Q_2GZ)X_n$" groups, and is chemically bonded to the $Cp^4$ groups; and The metallocene catalyst component can be described more particularly in structures (IXa-i), (IXa-ii), (IXb), (IXc), (IXd), (IXe), and (IXf):

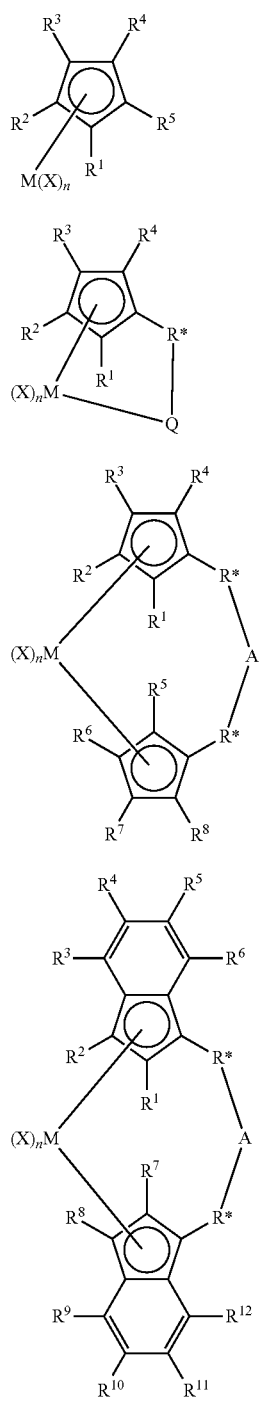
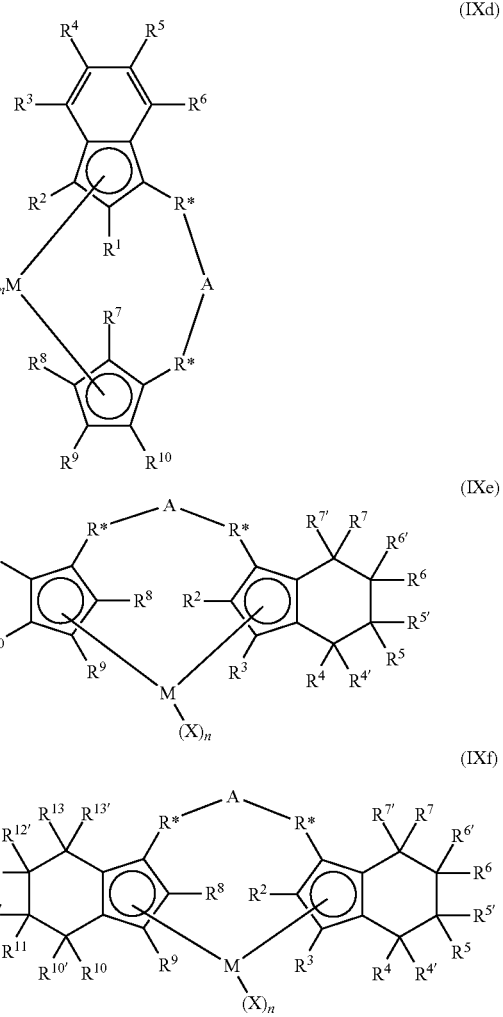

In structures (IXa-i) to (IXf), M may be selected from the group consisting of Group 3 to Group 12 atoms; or may be selected from Group 3 to Group 10; or may be selected from Group 3 to Group 6 atoms; or may be selected from the group consisting of Group 4 atoms; or may be selected from Zr or Hf; or may be Zr.

In structures (IXa-i) to (IXf), Q may be selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, alkylenes, aryls, arylenes, alkoxys, aryloxys, amines, arylamines (e.g., pyridyl) alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q may comprise from 1 to 20 carbon atoms; and wherein the aromatic groups may comprise from 5 to 20 carbon atoms.

In structures (IXa-ii) to (IXf), each R* may be independently selected from the group consisting of divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. In some embodiments, each R* may be independently selected from divalent hydrocarbylenes and heteroatom-containing hydrocarbylenes; or may be selected from alkylenes, substituted alkylenes, and heteroatom-containing hydrocarbylenes; or may be selected from $C_1$ to $C_{12}$ alkylenes, $C_1$ to $C_{12}$ substituted alkylenes, and $C_1$ to $C_{12}$ heteroatom-containing hydrocarbylenes; or may be selected from $C_1$ to $C_4$ alkylenes. In some embodiments of (IXb) to (IXf), both R* groups are the same.

In structures (IXa-i) to (IXf), A is as described above for (A) in structure (VI). In some embodiments, A may be selected from a chemical bond, —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons, and substituted and unsubstituted aryl groups; or may be selected from $C_5$ to $C_8$ cyclic hydrocarbons, —CH$_2$CH$_2$—, =CR$_2$, and =SiR$_2$.

In structures (IXa-i) to (IXf), each R may be independently selected from alkyls, cycloalkyls, aryls, alkoxys, fluoroalkyls, and heteroatom-containing hydrocarbons; or may be selected from $C_1$ to $C_6$ alkyls, substituted phenyls, phenyl, and $C_1$ to $C_6$ alkoxys; or may be selected from methoxy, methyl, phenoxy, and phenyl. In some embodiments, A may be absent, in which case each R* is defined as for $R^1$-$R^{13}$; each X is as described above in (I); n is an integer from 0 to 4, and from 1 to 3 in another embodiment, and 1 or 2 in yet another embodiment; and $R^1$ through $R^{13}$ are independently selected from hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, and aroylaminos $R^1$ through $R^{13}$ may also be selected independently from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons, and substituted derivatives thereof; or may be selected from hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, or $C_7$ to $C_{18}$ fluoroalkylaryls; or may be selected from hydrogen radical, fluorine radical, chlorine radical, methyl, ethyl, propyl, isopropyl, butyl, isobutyl, tertiary butyl, hexyl, phenyl, 2,6-di-methylphenyl, and 4-tertiarybutylpheyl groups; wherein adjacent R groups may form a ring, either saturated, partially saturated, or completely saturated.

The structure of the metallocene catalyst component represented by (IXa) may take on many forms such as disclosed in, for example, U.S. Pat. No. 5,026,798, U.S. Pat. No. 5,703,187, and U.S. Pat. No. 5,747,406, including a dimmer or oligomeric structure, such as disclosed in, for example, U.S. Pat. No. 5,026,798 and U.S. Pat. No. 6,069,213.

In a particular embodiment of the metallocene represented in (Vd), $R^1$ and $R^2$ form a conjugated 6-membered carbon ring system that may or may not be substituted.

It is contemplated that the metallocene catalysts components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components.

The "metallocene catalyst compound", also referred to herein as the metallocene catalyst component" may comprise any combination of any "embodiment" described herein.

Metallocene compounds and catalysts are known in the art and any one or more may be utilized herein. Suitable metallocenes include but are not limited to all of the metallocenes described in the U.S. patents cited above, as well as those disclosed and referenced in U.S. Pat. Nos. 7,179,876, 7,169,864, 7,157,531, 7,129,302, 6,995,109, 6,958,306, 6,884748, 6,689,847, U.S. Pat. App. Pub. No. 2007/0055028, and published PCT App. Nos. WO 97/22635, WO 00/699/22, WO 01/30860, WO 01/30861, WO 02/46246, WO 02/50088, WO 04/026921, and WO 06/019494. Additional catalysts suitable for use herein include those described in U.S. Pat. Nos. 6,309,997, 6,265,338, U.S. Pat. App. Pub. No. 2006/019925, and the following articles: Chem Rev 2000, 100, 1253, Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Activators

The catalyst compositions may further comprise an activator. As used herein, the term "activator" refers to any compound or component, or combination of compounds and components, capable of enhancing the ability of a catalyst to oligomerize or polymerize unsaturated monomers, such as olefins. It should be understood that the catalyst compositions may be activated for oligomerization and/or polymerization catalysis in any manner sufficient to allow coordination or cationic oligomerization and or polymerization.

Generally, embodiments of the catalysts may contain a formal anionic ligand, such as hydride or hydrocarbyl, with an adjacent coordination site accessible to an unsaturated monomer. Coordination of an unsaturated monomer to the adjacent coordination site allows a migratory insertion reaction to form a metal alkyl. Repetition of this process causes the chain growth associated with oligomerization and/or polymerization. An activator thus may be any compound or component, or combination of compounds and components, that facilitates formation of a transition metal compound containing an adjacent coordinated olefin and hydride or hydrocarbyl.

When the transition metal compound contains, for example, at least one hydride or hydrocarbyl ligand, activation may be achieved by removal of formal anionic or neutral ligand(s), of higher binding affinity than the unsaturated monomer. This removal, also called abstraction, process may have a kinetic rate that is first-order or non-first order with respect to the activator. Activators that remove anionic ligands are termed ionizing activators. Alternatively, activators that remove neutral ligands are termed non-ionizing activators. Examples of activators may include strong Lewis-acids which may play either the role of an ionizing or non-ionizing activator.

When the transition metal compound does not contain, for example, at least one hydride or hydrocarbyl ligands, then activation may be a one step or multi step process. One step in this process may include coordinating a hydride or hydrocarbyl group to the metal compound. A separate activation step may include removal of anionic or neutral ligands of higher binding affinity than the unsaturated monomer. These activation steps may occur, for example, in the presence of an olefin and occur either in series or in parallel. More than one sequence of activation steps is possible to achieve activation. The activator may also act to coordinate a hydride or hydrocarbyl group to the transition metal compound. When the transition metal compound does not contain at least one hydride or hydrocarbyl ligands, but does contain at least one functional group ligand, activation may be effected by substitution of the functional group with a hydride, hydrocarbyl or substituted hydrocarbyl group. This substitution may be effected with appropriate hydride or alkyl reagents of group 1, 2, 12, 13 elements as are known in the art. To achieve activation, it may be necessary to also remove anionic or neutral ligands of higher binding affinity than the unsaturated monomer.

In some embodiments, the activator may also act to coordinate a hydride or hydrocarbyl group to the transition metal compound. If the transition metal compound does not contain anionic ligands, then a hydride, hydrocarbyl or substituted hydrocarbyl may be coordinated to a metal using electrophilic proton or alkyl transfer reagents represented by H+(LB)nA−, (R)+(LB)nA−. R may be a hydrocarbyl or a substituted hydrocarbyl; LB is a Lewis-base, and wherein n=0, 1 or 2. Non-limiting examples of Lewis-bases are diethyl ether, dimethyl ether, ethanol, methanol, water, acetonitrile, N,N-dimethylaniline. A− is an anion, in one embodiment, a substituted hydrocarbon, a functional group, or a non-coordinating anion. Non-limiting examples of A− may include halides, carboxylates, phosphates, sulfates, sulfonates, borates, aluminates, alkoxides, thioalkoxides, anionic substituted hydrocarbons, anionic metal complexes, and the like.

Additional examples of suitable activators include those described in WO 98/07515, such as tris (2,2',2"-nonafluorobiphenyl) fluoroaluminate. Combinations of activators are also contemplated, for example, alumoxanes and ionizing activators in combination as described in the following references may be used, EP-B1 0 573 120, WO 94/07928, WO 95/14044 and U.S. Pat. Nos. 5,153,157 and 5,453,410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate).4THF as an activator for a metallocene catalyst compound. WO 99/18135 describes the use of organo-boron-aluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see e.g., EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849,852, 5,859,653 and 5,869,723 and PCT WO 98/32775.

Alumoxanes activators may be utilized as an activator in the catalyst composition of the invention. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. Alumoxanes are further described in, for example, U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1, and WO 94/10180.

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio, for example.

Alumoxanes may be produced by the hydrolysis of the respective trialkylaluminum compound. By way of example, MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in, for example, U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, WO 94/10180 and WO 99/15534. In some embodiments, a visually clear methylalumoxane may be used. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, disclosed in U.S. Pat. No. 5,041,584).

An ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (see, for example, WO 98/43983), boric acid (see, for example, U.S. Pat. No. 5,942,459) or a combination thereof, may also be used. It is also within the scope of this disclosure to use neutral or ionic activators alone or in combination with alumoxane or modified alumoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. In embodiments, the three substituent groups may be independently selected from the group of halogen, moNo. or multicyclic (including halosubstituted) aryls, alkyls, and alkenyl compounds and mixtures thereof; in a class of embodiments are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternatively, the three groups are alkyls having 1 to 4 carbon groups, phenyl, napthyl or mixtures thereof. In other embodiments, the three groups are halogenated, in an embodiment fluorinated, aryl groups. In yet other illustrative embodiments, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in, for example, European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994.

Supported Catalyst Compositions

The catalyst compositions may further comprise a support. For example, each component of the catalyst composition may be supported on a support. Spray-drying may be used for combining the catalyst components with the one or more supports. Spray-drying of the catalyst composition may result in catalyst compositions having increased catalyst productivity as compared to other techniques for catalyst preparation.

As used herein, the term "supported" refers to one or more compounds that are deposited on, contacted with, vaporized with, adsorbed or absorbed in, or on, a support or carrier. The terms "support" and "carrier," for the purposes of this specification, are used interchangeably and are any support material, such as a porous support material, including inorganic or organic support materials.

Non-limiting examples of suitable supports include compounds comprising Group 2, 3, 4, 5, 13 and 14 oxides and chlorides. Suitable supports may include, for example, silica, magnesia, titania, zirconia, montmorillonite, phyllosilicate, alumina, silica-alumina, silica-chromium, silica-titania, magnesium chloride, graphite, magnesia, titania, zirconia, montmorillonite, phyllosilicate, and the like. Combinations of supports may also be suitable, including, for example, silica-chromium, silica-alumina, silica-titania, and the like. In one embodiment, fumed silica is a suitable support.

The support may possess an average particle size in the range of from about 0.1 to about 50 µm, or from about 1 to about 40 µm, or from about 5 to about 40 µm.

The support, such as an inorganic oxide, may have a surface area in the range of from about 10 to about 700 m$^2$/g, a pore volume in the range of from about 0.1 to about 4.0 cc/g, and an average particle size in the range of from about 1 to about 500 µm. In some embodiments, the support may have a surface area in the range of from about 50 to about 500 m$^2$/g, a pore volume of from about 0.5 to about 3.5 cc/g, and an average particle size of from about 10 to about 200 µm. In some embodiments, the support may have a surface area in the range of from about 100 to about 400 m$^2$/g, a pore volume from about 0.8 to about 3.0 cc/g, and an average particle size is from about 5 to about 100 µm. In some embodiments, the average pore size of the support may be from about 1 to about 50 µm. In some embodiments, the average pore size of the support may be in the range of from about 10 to about 1000 Å, of from about 50 to about 500 Å, or from about 75 to about 350 Å.

The catalyst components may be supported on the same or separate supports together with an activator, or the activator may be used in an unsupported form, or may be deposited on a support different from the supported catalyst components, or any combination thereof.

As previously described, spray-drying may be used for combining the catalyst components with the one or more supports. Spray-drying of a catalyst composition may result in catalyst compositions having increased catalyst productivity as compared to other techniques for catalyst preparation. Exemplary techniques for spray-drying a catalyst composition are described, for example, in U.S. Pat. Nos. 5,648,310; 5,674,795; and 5,672,669, and EP0668295 B1.

The catalyst components and/or activators(s) may be combined with a particulate support material and then spray-dried, for example, to form a free flowing powder. By way of example, the catalyst components and optionally the activator(s) may be placed in solution, allowing them to react, then adding a filler material, such as silica or Cabosil™, and then forcing the solution at high pressure through a nozzle. The solution may be sprayed onto a surface or sprayed such that the droplets dry in midair. In some embodiments, the filler material (such as silica) may be dispersed in toluene, then stir in the activator solution, and then stir in the catalyst components. Typical slurry concentrations are about 5-8 wt %, for example. This formulation may sit as a slurry for as long as 30 minutes with mild stirring or manual shaking to keep it as a suspension before spray-drying. In some embodiments, the makeup of the dried material may be about 40-50 wt % activator (e.g., alumoxane), about 50-60 wt % filler material (e.g., SiO$_2$), and about 2 wt % catalyst components.

In some embodiments, the catalyst components can be added together in the desired ratio in the last step. In some embodiments, more complex procedures are possible, such as addition of a first catalyst component to the activator/filler material for a specified reaction time, followed by addition of a second catalyst component, mixed for another specified reaction time, after which the mixture is co-sprayed. For example, an additive, such as 1-hexene (e.g., about 10 vol %), may be present in the activator/filler mixture prior to addition of the first catalyst component.

In some embodiments, a metallocene catalyst component may be combined with a spray dried catalyst composition and then introduced into a reactor.

In some embodiments, binders may be added to the mix. For example, the binders can be added as a means of improving the particle morphology, i.e. narrowing the particle size distribution, lower porosity of the particles and allowing for a reduced quantity of alumoxane, which is acting as the binder.

Polymerization Processes

Embodiments of the polymerization processes may include polymerization of olefins in the presence of a spray-dried catalyst composition comprising a transition metal complex catalyst component. The polymerization may occur in the presence of a spray-dried mixed catalyst composition that comprises a transition metal complex catalyst component and a non-metallocene catalyst component, such as a Group 15-containing catalyst component or may occur in the presence of a spray-dried mixed catalyst composition comprising a transition metal complex catalyst component, a non-metallocene catalyst component, and a metallocene catalyst component.

Polymerization processes may include solution, gas phase, slurry phase and a high pressure process or a combination thereof. In illustrative embodiments, a gas phase or slurry phase polymerization of one or more olefins at least one of which is ethylene or propylene is provided.

The spray-dried catalyst compositions described above are suitable for use in any prepolymerization and/or polymerization process over a wide range of temperatures and pressures. The temperatures, for example, may be in the range of from about 60° C. to about 280° C., or from about 50° C. to about 200° C.; or from about 60° C. to about 120° C., or from about 70° C. to about 100° C., or from about 80° C. to about 95° C.

The polymerization process may be a solution, high pressure, slurry, or gas phase polymerization process of one or more olefin monomers having from 2 to 30 carbon atoms, alternatively 2 to 12 carbon atoms, or alternatively 2 to 8 carbon atoms. For example, the polymerization may be of two or more olefins or comonomers such as ethylene, propylene, 1-butene, 1-pentene, 4-methyl-1-pentene, 1-hexene, 1-octene, 1-decene, or the like.

Non-limiting examples of other olefins useful in the polymerization process include ethylenically unsaturated monomers, diolefins having 4 to 18 carbon atoms, conjugated or nonconjugated dienes, polyenes, vinyl monomers, and cyclic olefins. Non-limiting examples of useful monomers includes, but is not limited to, norbornene, norbornadiene, isobutylene, isoprene, vinylbenzocyclobutane, styrenes, alkyl substituted styrene, ethylidene norbornene, dicyclopentadiene, and cyclopentene.

The polymerization process may produce a copolymer of ethylene, where ethylene and a comonomer having at least one alpha-olefin having from 4 to 15 carbon atoms, or from 4 to 12 carbon atoms, or from 4 to 8 carbon atoms, is polymerized in a gas phase process.

In some embodiments, ethylene or propylene may be polymerized with at least two different comonomers, optionally one of which may be a diene, to form a terpolymer.

The polymerization process may include a gas phase polymerization process in which a continuous cycle may be employed, where in one part of the cycle of a reactor system, a cycling gas stream, otherwise known as a recycle stream or fluidizing medium is heated in the reactor by the heat of polymerization. This heat may be removed from the recycle composition in another part of the cycle by a cooling system external to the reactor. Generally, in a gas fluidized bed process for producing polymers, a gaseous stream containing one or more monomers may be continuously cycled through a fluidized bed in the presence of a catalyst under reactive conditions. The gaseous stream may be withdrawn from the fluidized bed and recycled back into the reactor. Simultaneously, polymer product may withdrawn from the reactor and fresh monomer is added to replace the polymerized monomer. Gas phase polymerization process are described in more detail in, for example, U.S. Pat. Nos. 4,543,399, 4,588,790, 5,028,670, 5,317,036, 5,352,749, 5,405,922, 5,436,304, 5,453,471, 5,462,999, 5,616,661, and 5,668,228.

The reactor pressure in a gas phase process may vary, for example, from about atmospheric pressure to about 600 psig, or from about 100 psig (690 kPa) to about 500 psig (3448 kPa), or from about 200 psig (1379 kPa) to about 400 psig (2759 kPa), or from about 250 psig (1724 kPa) to about 350 psig (2414 kPa).

The reactor temperature in a gas phase process may vary, for example, from about 30° C. to about 120° C., or from about 60° C. to about 115° C., or from about 70° C. to about 110° C., or from about 70° C. to about 95° C.

Additional examples of gas phase processes that may be used include those described in U.S. Pat. Nos. 5,627,242, 5,665,818 and 5,677,375, and European publications EP-A-0 794 200, EP-A-0 802 202, EP-A2 0 891 990, and EP-B-634 421.

Embodiments of the polymerization process may include a slurry polymerization process. In the slurry polymerization process, pressures may range from about 1 to about 50 atmospheres and temperatures may range from about 0° C. to about 120° C. In a slurry polymerization, a suspension of solid, particulate polymer may be formed in a liquid polymerization diluent medium to which ethylene and comonomers and often hydrogen along with catalyst are added. The suspension including diluent may be intermittently or continuously removed from the reactor where the volatile components are separated from the polymer and recycled, optionally after a distillation, to the reactor. The liquid diluent employed in the polymerization medium may typically be an alkane having from 3 to 7 carbon atoms, preferably a branched alkane. The medium employed should be liquid under the conditions of polymerization and relatively inert. When a propane medium is used the process should be operated, for example, above the reaction diluent critical temperature and pressure. In some embodiments, a hexane or an isobutane medium is employed.

Continuity Additives/Static Control Agents

In processes disclosed herein, it may also be desired to additionally use one or more static control agents or continuity additives to aid in regulating static levels in the reactor. For the purposes herein, the terms "static control agents" and "continuity additives" are used interchangeably. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the catalyst being used. For example, the use of static control agents is disclosed in European Patent No. 0229368 and U.S. Pat. No. 5,283,278 and references cited therein.

The static control agent used may be selected for its ability to receive the static charge in the fluidized bed without adversely affecting productivity. Suitable static control agents may also include aluminum stearate, aluminum distearate, ethoxylated amines, polyethers, amine end-capped polyethers, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

Other useful static control agents include those described in, for example, WO 01/44322, listed under the heading Carboxylate Metal Salt. In some embodiments, a carboxylate metal salt may be combined with an amine containing control agent (e.g., a carboxylate metal salt with any family member belonging to the KEMAMINE (available from Crompton Corporation) or ATMER (available from ICI Americas Inc.) family of products). Additionally, the carboxylate metal salt may also be combined with a polyether or amine end-capped polyether static control agent. Other useful static control agents are described in the US 2008/0045663, for example.

The static Control agent added to the reactor may be a combination of two or more of the above listed static control agents. The static control agent(s) may be added to the reactor in the form of a solution or a slurry, and may be added to the reactor as an individual feed stream or may be combined with other feeds prior to addition to the reactor. For example, the static control agent may be combined with the catalyst or catalyst slurry prior to feeding the combined catalyst-static control agent mixture to the reactor.

The static control agent may be added to the reactor in an amount ranging from 0.05 to 200 ppm, or from 2 to 100 ppm, or from 4 to 50 ppm, based on the weight of all feeds to the reactor, excluding recycle.

Polymer Products

The polymers produced by the polymerization processes described herein can be used in a wide variety of products and end-use applications. The polymers produced herein may include, but are not limited to, linear low density polyethylene, low density polyethylenes, and high density polyethylenes.

The polymers, including ethylene and propylene based polymers, may have a density, in the range of from about 0.86 g/cm$^3$ to about 0.97 g/cm$^3$, or in the range of from about 0.88 g/cm$^3$ to about 0.965 g/cm$^3$, or in the range of from about 0.900 g/cm$^3$ to about 0.96 g/cm$^3$.

The polymers may have a molecular weight distribution, a weight average molecular weight to number average molecular weight (Mw/Mn), for example, of from about 1.5 to about 25, or from about 2 to about 20, or from about 2.2 to 15.

The polymers may have a melt index (MI) or ($I_2$) in the range of from 0.01 dg/min to 1000 dg/min, or from about 0.01 dg/min to about 100 dg/min, or from about 0.1 dg/min to about 100 dg/min.

The polymers may have a melt index ratio ($I_{21}/I_2$) of from 5 to 300, or from about 10 to 250, or from 15 to 200, or from 20 to 180.

The polymers may be blended and/or coextruded with any other polymer. Non-limiting examples of other polymers include linear low density polyethylenes produced via conventional and/or single-site catalysis, elastomers, plastomers, high pressure low density polyethylene, high density polyethylenes, polypropylenes and the like.

Polymers produced by the processes described herein and blends thereof are useful in such forming operations as film, pipe, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers may include, are not limited to, melt spinning, solution spinning and melt blown fiber operations for use in woven or non-woven form to make filters, diaper fabrics, medical garments, geotextiles, etc. Extruded articles may include medical tubing, wire and cable coatings, geomembranes, and pond liners. Molded articles include single and multi-layered constructions in the form of bottles, tanks, large hollow articles, rigid food containers and toys, etc.

Test Methods

Density values are based on ASTM D1505.

Melt Index (MI), $I_2$, is measured according to ASTM-D-1238-E (190° C., 2.16 kg weight).

Melt Index (MI5), $I_5$, is measured according to ASTM-D-1238-G (190° C., 5 kg weight).

Flow Index (FI), $I_{21}$, is measured according to ASTM-D-1238-F (190° C., 21.6 kg weight).

Melt Flow Ratio (MFRS, $I_{21}/I_5$) is the ratio of $I_{21}$ over $I_5$ as determined by ASTM D1238.

SEC measurements are provided in accordance with the following procedure, using Polymer Laboratories instrument; Model: HT-GPC-220, Columns: Shodex, Run Temperature: 140° C., Calibration Standard: traceable to NIST, Solvent: 1,2,4-Trichlorobenzene.

EXAMPLES

The following examples are put forth so as to provide those skilled in the art with a complete disclosure and description of how to make and use the compounds of the invention, and are not intended to limit the scope of that which the inventors regard as their invention. All parts, proportions, and percentages are by weight unless otherwise indicated. All examples were carried out in dry oxygen-free environments and solvents unless otherwise indicated.

The transition metal complex catalyst component used in the following examples comprised 2,6-diacetylpyridinebis(2,4,6-trimethyl-phenylamine)FeCl$_2$, which was prepared in a manner substantially similar to that disclosed in Small, B. L. et. al. *J. Am. Chem. Soc.* 1998, 120, 4049-1050. The transition metal complex catalyst is referred to throughout these examples as TMC-1 and the structure of TMC-1 is shown below:

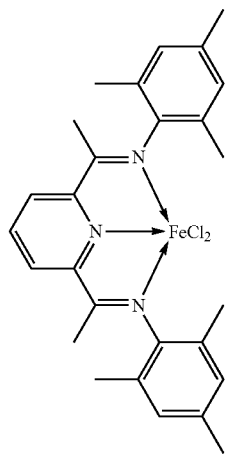

Example 1

The following example relates to gas phase ethylene polymerization procedures carried out under gas phase lab reactor conditions. The reactor was used to evaluate different support methods for a catalyst composition that comprises a transition metal catalyst component. Table 1 demonstrates the catalyst productivity for the catalyst compositions using the different support methods.

Support Method A

In Support Method A, the TMC-1 component was supported on MAO impregnated silica (Davison 955 grade silica calcined at 600° C.) according to the following procedure: 1.00 g of MAO impregnated silica and 0.026 g of TMC-1 were combined and suspended in 10 mL toluene. The suspension was allowed to stir for two hours at ambient temperature (about 25° C.) before the volatiles were removed from the suspension under vacuum. The supported transition metal catalyst composition was recovered as a light tan free flowing powder in near quantitative yield. The recovered supported transition metal catalyst composition is referred to throughout the examples as TMC-A.

Support Method B

In Support Method B, a spray-drying process was used to produce a supported catalyst composition. An example of a typical procedure used is as follows: a slurry was prepared by combining 12.3 lbs of a 10 wt % MAO solution in toluene, 1.7 lbs of a fumed silica filler and 18 lbs of toluene. The slurry was mixed for one hour at 40° C. before the addition of 35.7 g TMC-1 to the mixture and an additional one hour of mixing at 40° C. The above slurry was then spray-dried using a pilot-scale spray dryer. The slurry was fed to the spray-dryer at a feed rate of 85.5 pounds per hour. The atomizer speed was maintained at 90%. The outlet temperature at the condenser was maintained at about 80° C. The spray-dried particles had an iron loading of 0.0406 mmol/g, an Al loading of 5.99 mmol/g, and an Al/M ratio of 148:1. The spray-dried catalyst composition is referred to throughout the examples as TMC-B.

Ethylene Polymerization in a Lab Scale Gas Phase Reactor

The supported catalyst compositions described above were used in ethylene polymerization reactions conducted in a lab-scale gas phase polymerization reactor. The gas phase reactor employed is a 1.65 liter, stainless steel autoclave equipped with a variable speed mechanical agitator. For maximum mixing, the reactor is normally operated at a 45 degree angle from its vertical position during polymerization. In a standard HDPE run, the reactor was first charged with 400 g of NaCl and dried by heating at 95° C. under a stream of nitrogen for one hour. After baking out the reactor, the temperature is lowered to approximately 60° C. to introduce 5 g SMAO (silica supported methylaluminoxane) as a scavenger with help of nitrogen pressure. After adding SMAO, the reactor was sealed and components were gently stirred. The reactor was then charged with the desired amounts of hydrogen and 1-hexene, if any. The reactor is then pressurized with ethylene (160-230 psig). Once the system reaches a steady state, catalyst is charged into the reactor using a stainless steel bomb to start polymerization. The reactor temperature is then brought up to the specified temperature (100° C.) and maintained at this temperature through the run. The polymerization is typically carried out for 60 minutes and during this time hydrogen, $C_6/C_2$ ratio and ethylene pressure are kept constant. At the end of the 60 minute run time, the reactor is cooled down, vented and opened. The resulting mixture is then washed with water, methanol and dried. Table 1 provides a brief overview of the process conditions and catalyst productivities for the polymerization reactions with the supported catalyst compositions of this example. As can be seen in Table 1, the use of support method A affords an activated transition metal complex catalyst composition with only moderate productivities (<2,000 g/g). Surprisingly, the use of support method B (spray-drying) affords an activated transition metal complex catalyst component with more than double the productivity of support methods A.

TABLE 1

| Run No. | Pre-Catalyst | Support Method | T (° C.) | $H_2$ (ppm) | Catalyst Productivity (g PE/g catalyst) |
|---|---|---|---|---|---|
| 1 (comparative) | TMC-1 | A | 100 | 3000 | 1980 |
| 2 (comparative) | TMC-1 | A | 85 | 3000 | 1640 |
| 3 | TMC-1 | B | 100 | 3000 | 4564 |

Example 2

Additional gas phase polymerization procedures were carried out in a pilot-scale gas phase fluidized bed reactor to further evaluate the use of spray-dried catalyst compositions comprising a transition metal complex catalyst component. Table 2 below demonstrates the catalyst productivity for the spray-dried catalyst composition comprising a transition metal complex catalyst component in comparison to a comparative catalyst composition.

Catalyst Compositions

In this example, the spray-dried transition metal complex TMC-B was compared to a comparative catalyst composition. The comparative catalyst composition (CCC-1) was a bi-metallic catalyst that is comprised of (tetramethylcyclopentadiene)(n-propylcyclopentadiene) zirconium dichloride and bis(2-(pentamethylphenylamido)ethyl)amine zirconium dibenzyl, supported on fumed silica with methylalumoxane. Methods of preparing CCC-1 are disclosed in, for example, U.S. Pat. No. 6,271,325.

Ethylene Polymerization in a Pilot-Scale Gas Phase Reactor

The catalyst compositions of this example were used in polymerization reactions conducted in a continuous pilot-scale gas phase fluidized bed reactor of 0.35 meters internal diameter and 2.3 meters in bed height. Each run was operated using the same continuous gas phase fluidized reactor. The fluidized bed is made up of polymer granules. The gaseous feed streams of ethylene and hydrogen together with liquid comonomer were mixed together in a mixing tee arrangement and introduced below the reactor bed into the recycle gas line. 1-hexene was used as the comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen-to-ethylene mole ratio. The concentration of all the gases was measured by an on-line gas chromatograph to ensure relatively constant composition in the recycle gas stream.

The catalyst compositions (TMC-B and CCC-1) were injected directly into the reactor as a slurry in purified mineral oil, and the rate of the slurry catalyst feed was adjusted to maintain a constant production rate of polymer. For CCC-1, a trim of the precatalyst (tetramethylcyclopentadiene)(n-propylcyclopentadiene) zirconium dimethyl was added to the catalyst feed stream prior to its injection into the reactor to adjust for targeted product properties. A continuity additive (a mixture of aluminum distearate and an ethoxylated amine type compound) was injected directly into the fluidized bed independently from the catalyst composition using purified nitrogen as a carrier. The rate of the continuity additive feed was adjusted to maintain a constant continuity additive to product ratio.

The reacting bed of growing polymer particles was maintained in a fluidized state by the continuous flow of the makeup feed and recycle gas through the reaction zone. A superficial gas velocity of 1.8-2.1 ft/sec was used to achieve this. The reactor was operated at a total pressure of about 350 psig. To maintain a constant reactor temperature, the temperature of the recycle gas was continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber, which was simultaneously vented back to the reactor. This allows for highly efficient removal of the product, while at the same time recycling a large portion of the unreacted gases back to the reactor. This product was purged to remove entrained hydrocarbons and treated with a small steam of humidified nitrogen to deactivate any trace quantities of residual catalyst.

Table 2 provides a brief overview of the process conditions, resin properties, and catalyst productivities for the polymerization reactions.

As illustrated by Table 2, a slightly higher catalyst productivity was observed for TMC-B as compared to CCC-1 at 105° C. reactor temperature. Surprisingly, decreasing the reactor temperature to 95° C. afforded an approximately 65% increase in productivity (12,243 g/g v. 7,724 g/g for ex. 2a and 8,896 g/g for ex. 2b) for TMC-B. Even further, as shown by FIG. 1, TMC-B afforded a polyethylene resin with substantially higher overall molecular weight and a broader molecular weight distribution at the lower reactor temperature.

Figure 2:
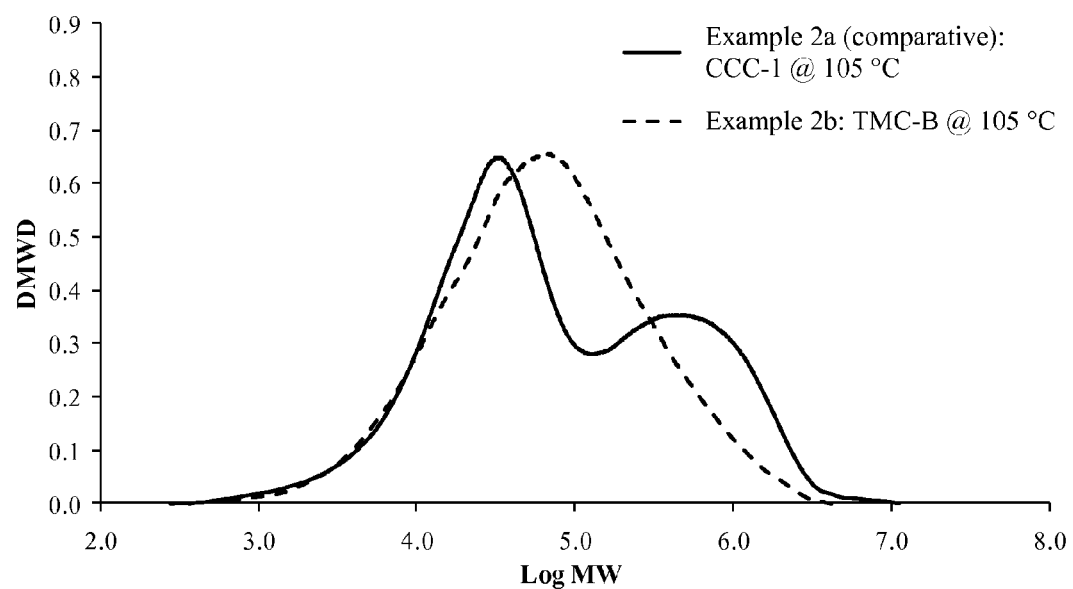
Figure 3:
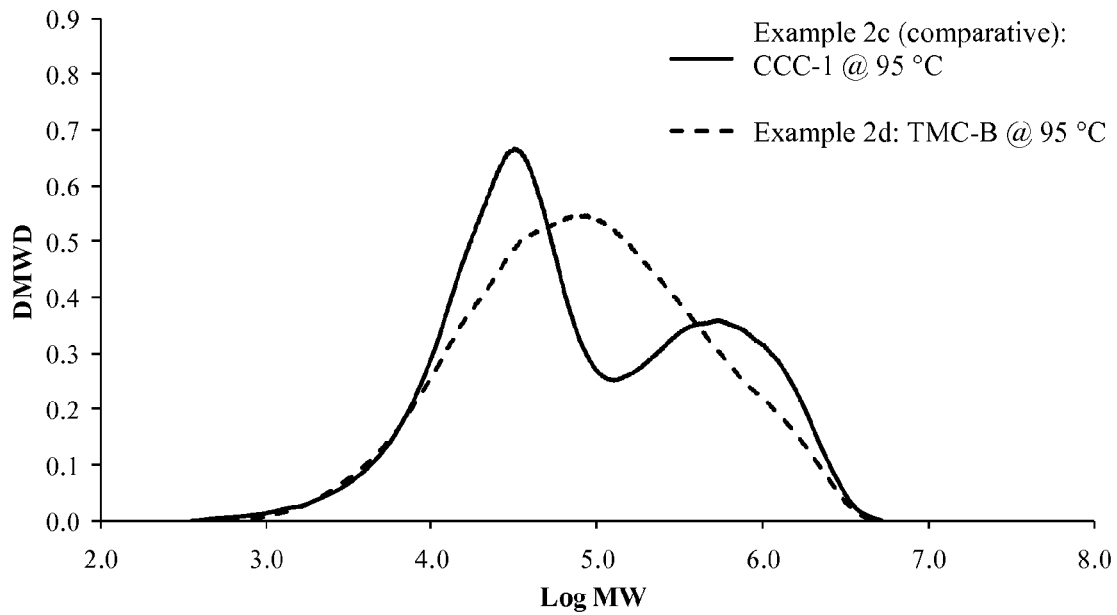

Additionally, FIGS. 2 and 3 show the GPC overlays of the resins produced in this example at reactor temperatures of 105° C. and 95° C., respectively. At 105° C., the molecular weight distribution of the polymer made with TMC-B overlaps primarily with the low- and mid-molecular weight regimes of the polymer made with CCC-1 (example 2a), while at 95° C. the breadth of TMC-B polymer's molecular weight distribution spans the majority of the bimodal molecular weight distributions of the comparative example 2c.

Example 3

Additional gas phase polymerization procedures were carried out in a pilot-scale gas phase fluidized bed reactor to further evaluate the use of spray-dried mixed catalyst compositions comprising a transition metal complex catalyst component. Table 4 below demonstrates the catalyst productivity for the spray-dried mixed catalyst compositions comprising a transition metal complex.

Catalyst Preparation

The transition metal complex TMC-B as well as two mixed catalyst compositions comprising the transition metal complex TMC-1 were spray-dried as described above in Example 1 using support method B. For the mixed catalyst compositions ("M-1" and "M-2"), TMC-1 and bis(2-(pentamethylphenylamido)ethyl)amine zirconium dibenzyl ("Comp. A") were both added to the toluene slurry of MAO and fumed silica filler. This slurry was allowed to mix for one hour at 40° C. before being spray-dried. As seen below in Table 3, two mixed catalyst compositions comprising the transition metal complex TMC-1 and Comp. A were prepared with different loading levels of the catalyst components.

TABLE 2

| | Example | | | |
|---|---|---|---|---|
| | 2a (comparative) | 2b | 2c (comparative) | 2d |
| Catalyst | CCC-1 | TMC-B | CCC-1 | TMC-B |
| $C_2$ Partial Pressure (psi) | 220 | 220 | 220 | 220 |
| Reactor Temperature (° C.) | 105 | 105 | 95 | 95 |
| $H_2/C_2$ Ratio (mol/mol) | 0.0015 | 0.0015 | 0.0015 | 0.0015 |
| $C_6/C_2$ Ratio (mol/mol) | 0.0052 | 0.0065 | 0.0050 | 0.0065 |
| Residence Time (hrs.) | 2.9 | 3.2 | 3.2 | 3.2 |
| Continuity Additive (ppm[1]) | 41 | 44 | 43 | 44 |
| $I_5$ (dg/min) | 0.20 | 1.13 | 0.16 | 0.28 |
| $I_{21}$ (dg/min) | 6.5 | 15.6 | 6.0 | 4.7 |
| $I_{21}/I_5$ | 32.4 | 13.8 | 36.7 | 16.4 |
| $M_w$ (kDa) | 319.2 | 171.0 | 321.4 | 266.0 |
| $M_w/M_n$ | 15.3 | 7.8 | 15.0 | 10.4 |
| Density (g/cc) | 0.949 | 0.960 | 0.949 | 0.959 |
| Material Balance Catalyst Productivity (g PE/g catalyst) | 7724 | 8896 | 8090 | 12243 |

[1]Parts per million based on production rate

TABLE 3

| Catalyst | Catalyst Component 1 | Catalyst Component 2 | Fe Loading (mmol/g)[1] | Zr Loading (mmol/g)[1] | Al Loading (mmol/g)[1] | Spray-Drying Conditions | | |
|---|---|---|---|---|---|---|---|---|
| | | | | | | Atomizer Speed (%) | Slurry Feed Rate (lbs/hr) | Outlet T (° C.) |
| TMC-B | TMC-1 | None | 0.0406 | None | 5.99 | 90 | 84.80 | 80.1 |
| M-1 | Comp. A | TMC-1 | 0.0172 | 0.0245 | 5.51 | 90 | 85.50 | 80.5 |
| M-2 | Comp. A | TMC-1 | 0.0122 | 0.0358 | 6.10 | 90 | 88.10 | 80.0 |

[1]Determined by ICP-OES

Ethylene Polymerization in a Pilot-Scale Gas Phase Reactor

The catalyst compositions of this example were used in polymerization reactions conducted in a continuous pilot-scale gas phase fluidized bed reactor. The reactor was operated as described above in Example 2 with a trim of (tetramethylcyclopentadiene)(n-propylcyclopentadiene) zirconium dimethyl was added to the catalyst feed stream prior to its injection into the reactor in the case of polymerization reactions with the mixed catalyst compositions (M-1 and M-2) to adjust for targeted product properties. Table 4 provides a brief overview of the process conditions, resin properties, and catalyst productivities for the polymerization reactions.

TABLE 4

| Example | 3a | 3b | 3c | 3d |
|---|---|---|---|---|
| Catalyst | M-1 | M-2 | M-1 | M-2 |
| $C_2$ Partial Pressure (psi) | 220 | 220 | 220 | 220 |
| Reactor Temperature (° C.) | 105 | 105 | 95 | 95 |
| $H_2/C_2$ Ratio (mol/mol) | 0.0015 | 0.0015 | 0.0015 | 0.0015 |
| $C_6/C_2$ Ratio (mol/mol) | 0.0060 | 0.0065 | 0.0065 | 0.0065 |
| Residence Time (hrs.) | 3.2 | 2.7 | 2.7 | 3.0 |
| Continuity Additive (ppm[1]) | 45 | 36 | 39 | 40 |
| $I_5$ (dg/min) | 0.27 | 0.22 | 0.24 | 0.21 |
| $I_{21}$ (dg/min) | 6.1 | 6.0 | 5.9 | 6.1 |
| $I_{21}/I_5$ | 22.9 | 26.9 | 24.4 | 29.6 |
| $M_w$ (kDa) | 251.5 | 274.5 | 250.0 | 274.4 |
| $M_w/M_n$ | 10.6 | 12.1 | 11.3 | 12.4 |
| Density (g/cc) | 0.951 | 0.949 | 0.950 | 0.949 |
| Material Balance Catalyst Productivity (g PE/g catalyst) | 5,720 | 7,923 | 6,829 | 9,757 |

[1]Parts per million based on production rate.

Figure 4:
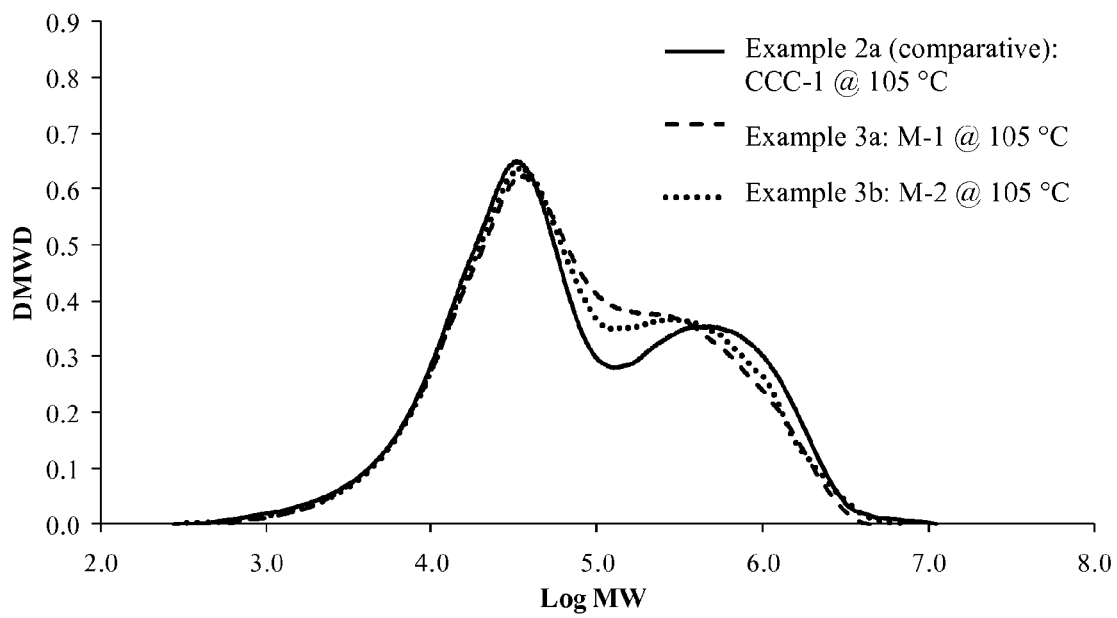
Figure 5:
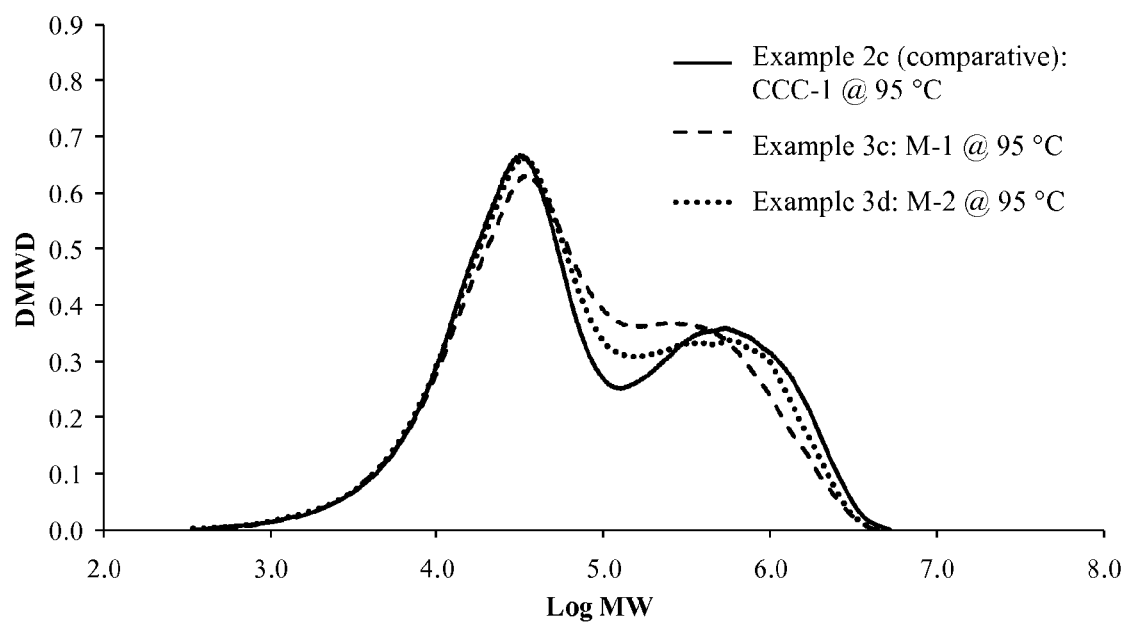

As illustrated by Table 4, M-2 exhibits improved catalyst productivities compared to M-1 at both reactor temperatures examined (105° C. and 95° C.). Furthermore, compared to the comparative examples 2a and 2c (Table 2), spray-dried M-2 has a substantially higher catalyst productivity (example 3d, Table 4). Surprisingly, it was further observed that, at similar resin $I_{21}$ values, the catalyst compositions of this example achieved a higher $I_5$ value and thus a lower $I_{21}/I_5$ ratio when compared to examples 2a and 2c with the CCC-1 catalyst. FIGS. 4 and 5 show the GPC overlay of the resin produced by spray-dried mixed catalyst compositions of this example and the CCC-1 catalyst at reactor temperatures of 105° C. and 95° C., respectively. The molecular weight distribution of the resin produced in this example showed a reduction in the $M_w$ as well as an overall reduction of the molecular weight distribution ($M_w/M_n$) when compared to examples 2a and 2c. It was further observed that the molecular weight distribution of the resin produced using M-1 and M-2 narrows slightly with increasing TMC-1 content at both reactor temperatures. Of note, when compared to the CCC-1 catalyst (examples 2a and 2c), the spray-dried mixed catalyst compositions show a "filling" of the valley in the multimodal molecular weight distribution at both reactor temperatures of 105° C. and 95° C. Additionally, a slightly less pronounced valley of the multimodal molecular weight distribution was observed for the resin produced using M-1 compared to that produced by M-2.

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

What is claimed is:

1. A composition comprising:
a spray-dried catalyst composition comprising:
a transition metal catalyst component represented by the following formula:

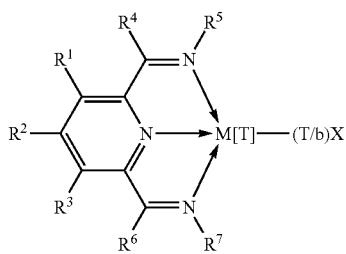

wherein:
M is Fe[II], Fe[III], Co[I], Co[II], Co[III], Mn[I], Mn[II], Mn[III], Mn[IV], Ru[II], Ru[III] or Ru[IV];
X represents an atom or group covalently or ionically bonded to the metal M;
T is the oxidation state of the metal;
b is the valency of the atom or group X; and
$R_1$ to $R_7$ are each independently selected from the group consisting of hydrogen, halogen, hydrocarbyl, substituted hydrocarbyl, heterohydrocarbyl, substituted heterohydrocarbyl, aryl, hydrocarbyl substituted aryl, heterohydrocarbyl substituted aryl, benzyl, hydrocarbyl substituted benzyl, heterohydrocarbyl substituted benzyl and $SiR'_3$ where each R' is independently selected from hydrogen, halogen, hydrocarbyl, substituted hydrocarbyl, heterohydrocarbyl, substituted heterohydrocarbyl; and when any two or more of $R_1$ to $R_7$ are hydrocarbyl, substituted hydrocarbyl, heterohydrocarbyl, substituted heterohydrocarbyl, aryl, hydrocarbyl substituted aryl, heterohydrocarbyl substituted aryl, benzyl, hydrocarbyl substituted benzyl or heterohydrocarbyl substituted benzyl the two or more can be linked to form one or more cyclic substituents;
an activator; and
a support, where the transition metal catalyst component and the activator are supported by the support and the spray-dried catalyst composition is a free flowing powder.

2. The composition according to claim 1:
wherein $R^5$ of the transition metal catalyst component is represented by the following formula:

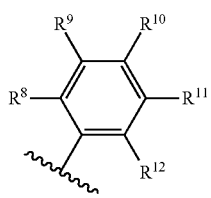

wherein $R^7$ of the transition metal catalyst is represented by the following formula:

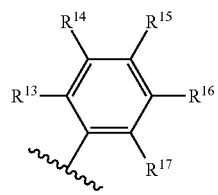

wherein $R^8$ to $R^{17}$ of the transition metal catalyst are independently selected from the group consisting of hydrogen, halogen, hydrocarbyl, substituted hydrocarbyl, heterohydrocarbyl, and substituted heterohydrocarbyl, when any two or more of $R^1$ to $R^4$, $R^6$ and $R^8$ to $R^{17}$ are hydrocarbyl, substituted hydrocarbyl, or substituted heterohydrocarbyl, the two or more can be linked to form one or more cyclic substituents.

3. The composition according to claim 2, wherein $R^1$ to $R^4$, $R^6$, and $R^8$ to $R^{17}$ are each independently selected from the group consisting of hydrogen, halogen, and $C_1$ to $C_8$ hydrocarbyl.

4. The composition according to claim 2, wherein $R^{10}$ and $R^{15}$ are each independently selected from group consisting of hydrogen, $C_1$ to $C_8$ hydrocarbyl, benzyl, fluorine, chlorine, bromine, and iodine.

5. The composition according to claim 2, wherein $R^1$, $R^2$, $R^3$, $R^9$, $R^{11}$, $R^{14}$ and $R^{16}$ are each hydrogen; and $R^4$, $R^6$, $R^8$, $R^{10}$, $R^{12}$, $R^{13}$, $R^{15}$ and $R^{17}$ are each represented by methyl.

6. The composition according to claim 1, wherein the spray-dried catalyst composition further comprises a non-metallocene catalyst component, wherein the non-metallocene catalyst component is a Group-15 containing catalyst.

7. The composition according to claim 6, wherein the non-metallocene catalyst component is represented by the following formula:

$$\alpha_a\beta_b\gamma_gMX_n$$

wherein:
M is a metal atom;
X is independently selected from the group consisting of halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, halogenated $C_1$ to $C_{12}$ alkyls, halogenated $C_2$ to $C_{12}$ alkenyls, halogenated $C_6$ to $C_{12}$ aryls, halogenated $C_7$ to $C_{20}$ alkylaryls, halogenated $C_1$ to $C_{12}$ alkoxys, halogenated $C_6$ to $C_{16}$ aryloxys, halogenated $C_7$ to $C_{18}$ alkylaryloxys, $C_1$ to $C_{12}$ heteroatom-containing hydrocarbons, and substituted derivatives thereof;
β and γ are groups that each comprise at least one Group 14 to Group 16 atom;
α is a linking moiety that forms a chemical bond to each of β and γ; and
a, b, g, and n are each integers from 1 to 4.

8. The composition according to claim 7, wherein M is zirconium or hafnium.

9. The composition according to claim 6, wherein a mole ratio of the non-metallocene component to the transition metal catalyst component ranges from about 1:1 to about 5:1.

10. The composition according to claim 1, wherein the spray-dried catalyst composition further comprises a metallocene catalyst component.

11. The composition according to claim 10, wherein the metallocene catalyst component is represented by the following formula:

$$Cp^A Cp^B MX_n$$

wherein:
  M is a metal atom;
  $Cp^A$ and $Cp^B$ are each individually substituted or unsubstituted cyclopentadienyl ligands;
  X is a leaving group; and
  N is zero or an integer from 1 to 4.

12. The composition according to claim 10, wherein M is zirconium or hafnium.

13. A polymerization process comprising combining an olefin with the composition according to claim 1.

14. The polymerization process according to claim 13, wherein the olefin comprises ethylene.

15. The polymerization process according to claim 13, wherein the olefin comprises propylene.

16. The polymerization process according to claim 13, wherein the olefin comprises a $C_4$ to $C_{15}$ alpha olefin.

17. The polymerization process according to claim 13, wherein the polymerization process occurs in a gas phase reactor.

18. The polymerization process according to claim 13, wherein the polymerization process occurs at a temperature of about 30° C. to about 120° C.

* * * * *